Patented Mar. 27, 1951

2,546,547

UNITED STATES PATENT OFFICE 2,546,547

ELECTRODEPOSITION OF MANGANESE

John Koster, Crimora, Va., assignor to Crimora Research and Development Corporation, Crimora, Va., a corporation of Virginia No Drawing. Application February 26, 1945, Serial No. 579,885

1 Claim. (Cl. 204—45)

This invention relates, generally, to the electrodeposition or electro-plating of manganese and it has particular relation to the deposition or plating thereof in a single compartment cell.

In the electrolysis of manganese solutions, the proper conditions for the deposition of manganese on the cathode are maintained usually by means of a two-compartment or diaphragm cell. In such a cell, the pH of the catholyte, from which the manganese is deposited, can be maintained at the proper level, while the anolyte is allowed to become acid without affecting the pH of the catholyte. The two compartments of such a cell are separated by a diaphragm. However, the use of such diaphragms is inconvenient.

Accordingly, one of the aims of this invention is to provide for the electro-deposition of manganese with out the use of a diaphragm or two-compartment cell. Another aim is to provide for using a single compartment cell for this purpose that is efficient and economical in operation.

It is possible to deposit manganese electrolytically without the use of a diaphragm, if there is a sufficiently rapid movement of the electrolyte through the cell. When this occurs, the relative amount of manganese removed is small and the amount of acid produced is correspondingly small. Thus, the acid content of the electrolyte is not increased to an objectionable extent as the electrolyte passes through the cell.

The manganese content of an electrolyte, used as just described, can be made up by the addition of manganous oxide or manganese carbonate. However, it is necessary to employ an extensive purification system for the reason that these materials are not readily available in highly purified form. Moreover, it is necessary to circulate a relatively large amount of electrolyte, since the pH may be raised by the solution of these materials to only approximately the neutral point or 7.0. This leaves only a slight acidity which can be neutralized because it is not possible to plate effectively from a solution passing through a single-compartment cell when the pH of the solution falls appreciably below 5.5.

It is, of course, possible to purify the manganous oxide before using it to replenish the manganese in the electrolytic circuit of a single-compartment cell. However, this does not overcome the requirement for the circulation of a relatively large amount of electrolyte nor the relatively long time required for the dissolving of manganous oxide in solutions having a pH of 5.5 and above.

It is, therefore, another aim of this invention to replace or replenish the manganese content of the electrolyte in a single-compartment cell circuit in such manner as to overcome the foregoing and other objections.

Other aims and advantages of the invention and the scope thereof are set forth in the following description and the appended claim.

In accordance with the invention, the manganese content of the electrolyte in a single-compartment cell is made up by the addition of finely divided electrolytic manganese. The electrolytic manganese may be reduced to finely divided or granulated form by a ball mill or by passing it between mill rolls and the like. The particle size is not critical. Such manganese can be added to any of the solutions which have been employed successfully for the electro-deposition of manganese. For example, it can be added to a solution containing about 25 grams per liter of manganese sulphate and about 150 grams per liter of ammonium sulphate. The solution may also contain a small amount of sulphur dioxide or other addition agent to stabilize it and to increase the current efficiency.

The finely divided electrolytic manganese may be added directly to the electrolyte in the cell for replenishing its manganese content. Also, it may be added in a separate compartment through which the spent electrolyte is circulated and returned to the cell.

Other electrolytes can also be used, such as those containing alkylolamine sulphate in place of ammonium sulphate. Also, hydroxylamine can be used for stabilizing purposes instead of sulphur dioxide. Moreover, plating can be accomplished by employing mixtures of other manganese salts and other ammonium salts, such as the chlorides. Other materials, such as glycerin or ammonium thiocyanate may be added to the bath. However, no addition agents are necessary to obtain bright, ductile plates of gamma manganese from electrolytes composed of pure manganese salts and ammonium salts in which the manganese content is maintained by adding pure, powdered, electrolytic manganese.

As an example of this invention, a series of 1½ to 4 hour plates were made from a solution containing about 50 grams of manganese per liter and 160 grams of ammonium sulphate per liter. For best results, using this solution, it was desirable to keep the pH of the catholyte above 7.5 and, preferably, over 8.2. In one experiment, powdered manganese was added to the catholyte; in another, it was added to the anolyte; and in still another, it was added simultaneously to both, No other addition agent, such as sulphur dioxide or other reducing agent, was required. The hydrogen evolved by the dissolution of the manganese is, of course, an excellent reducing agent.

As another example, continuous plates over periods up to 36 hours were made from a solution containing 40 grams of manganese, 165 grams of ammonium sulphate and 6.7 grams of boric acid, per liter. A solution of this composition requires that the liquor in the proximity of the cathode shall have a pH of about 6.5 for optimum plating efficiency. No diaphragm was used, but the pH was closely controlled by additions of powered electrolytic manganese. The electrolyte was circulated slowly during the tests, the spent liquor being treated with enough powdered manganese to bring its concentration back to 40 grams per liter, plus a slight excess. Activated charcoal was added and the mixture was filtered on a suction filter having a precoat of diatomaceous earth. The filtrate, which was always optically clear, was then returned to the feed tank. The cell was lined with chemical lead. The anodes were made of lead-silver alloy containing 1% silver and had been formed in the usual manner, so that production of manganese oxide was reduced to a minimum. The cathodes were sheets of stainless steel. The plate or deposit of manganese was stripped from the stainless cathode in a continuous sheet which was relatively soft and flexible and suitable for further use as starting cathode sheets in cells for electro-winning manganese.

In another example, manganese was plated from solutions similar to the above mentioned electrolytes. Manganese was supplied to the electrolyte by additions of powdered manganese. The cells were glass-lined and the anodes were composed of the same lead-silver alloy. Plating was done on cathodes of copper, stove pipe iron, ordinary black iron sheets, small brass items such as key-hole covers, door knobs, and other small hardware parts of various descriptions made of aluminum, copper, brass steel, iron lead, etc.

Deposits were also made on cathodes consisting of copper or steel plates covered with a mixture of flake graphite and paraffin wax, the surface being dusted with flake graphite immediately prior to immersion in the electrolytic cell. This facilitated removal of the deposited sheets.

It will be apparent that the particular electrolyte with which this invention can be employed is not critical. Tests, thus far, indicate that it can be used with any composition of electrolyte which is satisfactory for the electro-deposition of manganese.

When the manganese content of the electrolyte is made up with finely divided electrolytic manganese, several advantages are achieved. Since the manganese, thus added, is of high purity, there is correspondingly little tendency for the building up of impurities in the solution. Even those impurities, which are introduced, are removed by the reaction of the solution with the finely divided electrolytic manganese. Another advantage resides in the rapidity with which the finely divided manganese reacts with the electrolyte, even though it is neutral or substantially alkaline. This reaction is with the ammonium or alkylolamine salts of the solution and may take place to increase the pH up to 9 or 10 and increase the manganese concentration without precipitation of manganous hydroxide. Therefore, the operating range of the solution may be from the optimum pH for manganese deposition up to about 9. This is a marked contrast with the use, above described, of manganous oxide or manganese carbonate to make up the manganese of the solution at a pH of from 5.5 to 6.5.

The wider range of pH in which the circuit can be operated, when the manganese is replenished by the addition of finely divided electrolytic manganese, is important, not only with respect to the total amount of electrolyte which must be circulated, but also with respect to the withdrawal of only a part of the electrolyte and the addition thereto of finely divided electrolytic manganese. The withdrawn portion can be over-enriched with manganese and then it can be returned to the cell for mixing with the electrolyte therein and subsequent electrolysis. This permits considerable saving in equipment required and reduces the expense of solution handling.

Because of the high purity of the solution, which can be maintained by the foregoing process, the manganese can be deposited without using addition agents, such as sulphur dioxide. This is important, particularly when it is desired to have the deposit attain considerable thickness while it remains in the gamma modification. The presence in the electrolyte of sulphur dioxide or other sulphur compounds in the lower valences, increased the rate of transformation of the gamma form to the alpha form. For depositing the manganese in the gamma form, the electrolyte should be as free as possible from impurities and the presence of sulphur compounds in the lower valences of sulphur should be avoided. No disadvantage has been found in electro-plating with electrolytes containing sulphates. It has also been found that electrolytes made up of chlorides are satisfactory in the practice of this invention. They are considered to be especially favorable for the plating of gamma manganese.

Addition agents, which do not contain sulphur compounds in the lower valences, may be used advantageously with the high purity electrolyte of the present invention. For example, hydroxylamine acid sulphate and ammonium borate may be used as such agents. Both of these materials assist in stabilizing the solution and in promoting the formation of a bright and ductile plate. When boric acid salts are added to the solution, the plate is stable in air after it is removed from the electrolyte and rinsed with water. If desired, the manganese plates may be stabilized by dipping in a 5% solution of potassium dichromate, in a solution of ammonium borate, or phosphoric acid.

Various anodes, some already indicated, may be used in practicing this invention. They may be of lead, lead-silver, arsenic or some of the combinations of lead, cobalt and tin. Any impurities, which enter the electrolyte from these insoluble anodes, are removed by the action of the finely divided electrolytic manganese.

In general, it has been found that the simplicity of the control, which is obtained by having an insoluble anode and adding finely divided electrolytic manganese, either continuously or at controlled intervals, more than overcomes the expense and difficulty of maintaining a circulating electrolyte. Moreover, a more satisfactory deposit of manganese is obtained.

Since certain changes can be made in the foregoing invention without departing from the spirit and scope thereof, it is intended that all matter set forth herein shall be interpreted as illustrative and not in a limiting sense.

What is claimed is:

The process of electro-depositing substantially pure, gamma manganese in a single compartment cell having an insoluble anode and employing an electrolyte which consists of about 40 grams of manganese per liter and about 165 grams of ammonium sulphate per liter, wherein about 6.7 grams of boric acid per liter are added to the electrolyte, and wherein the electrolyte is circulated continuously through the cell, which comprises adding finely divided electrolytic manganese to the spent circulating electrolyte in sufficient amount to maintain the manganese content of the electrolyte in the cell substantially constant during the electrolysis; and maintaining the pH of the electrolyte in the cell approximately neutral.

JOHN KOSTER.

REFERENCES CITED

The following references are of record in the file of this patent:

UNITED STATES PATENTS

| Number | Name | Date |
|---|---|---|
| 2,317,153 | Dean | Apr. 20, 1943 |
| 2,320,773 | Fink et al. | June 1, 1943 |
| 2,356,515 | Guareschi | Aug. 22, 1944 |
| 2,398,614 | Bradt et al. | Apr. 16, 1946 |

FOREIGN PATENTS

| Number | Country | Date |
|---|---|---|
| 582,112 | Great Britain | Oct. 23, 1940 |

OTHER REFERENCES

Metal Industry, Mar. 22, 1940 (an article by A. Behr), pages 273, 274.

Clark, "Determination of Hydrogen Ions" (1927), pp. 108, 110 and 117.

Trans. of the Electrochemical Society, vol. 73, page 332 of an article by W. E. Bradt et al.

R. I. 3580, of Bureau of Mines, Sept. 1941, "Electrolyte Manganese and Its Alloys," by R. S. Dean, pp. 34, 35, and 36.